United States Patent Office 3,635,890
Patented Jan. 18, 1972

3,635,890
STABILIZATION OF POLYPHENYLENE OXIDES
Toshio Takemura, Kyoto, Isamu Nakagawa, Osaka, and Seizo Nakashio, Nishinomiya-shi, Japan, assignors to Sumitomo Chemical Company, Ltd., Osaka, Japan
No Drawing. Continuation-in-part of abandoned application Ser. No. 781,978, Dec. 6, 1968. This application Sept. 8, 1970, Ser. No. 70,577
Int. Cl. C08g 23/20
U.S. Cl. 260—47 ET      20 Claims

ABSTRACT OF THE DISCLOSURE

Polyphenylene oxides are stabilized to thermal oxidation by reacting the polymers with a halogenated phosphorus compound in the presence or absence of a basic compound.

CROSS-REFERENCES TO RELATED APPLICATIONS

This is a continuation-in-part of application Ser. No. 781,978 filed Dec. 6, 1968 and now abandoned.

This invention relates to a process for stabilizing polyphenylene oxides to thermal oxidation by reacting the hydroxyl groups thereof with halogenated phosphorus compounds.

Polyphenylene oxides hold attention as resins excellent in heat resistance, chemical resistance, and mechanical and electrical properties. These polymers, however, are low in oxidation resistance at elevated temperatures. Particularly when exposed to high temperatures in air or in the presence of oxygen, they undergo thermal oxidation relatively quickly to bring about such drawbacks as coloration, deterioration in flow properties or degradation in strength.

The present inventors made various studies on causes for the above-mentioned deterioration in properties of said polymers due to thermal oxidation and on processes for the prevention of said causes. As the result, the inventors have found that said thermal oxidation progresses chiefly by depolymerization brought about by free hydroxyl groups present at the terminals of the polyphenylene oxides or by oxidation reaction derived from the release of hydrogen atoms of said hydroxyl groups. The inventors have further found that in the case of polyphenylene oxides having oxidizable substituents such as hydrocarbon groups, substituted hydrocarbon groups or alkoxy groups in one or more of the 1-, 2-, 3- and 5-positions of the phenylene groups at the page 4, said substituents are partially oxidized at the time of polymerization to form hydroxyl groups, which also become a cause for the deterioration in properties of the polymers due to thermal oxidation. In addition thereto, there are causes which have not been elucidated.

The inventors have still further found that the thermal oxidation due to the free hydroxyl groups of polyphenylene oxides can be prevented by reacting the polyphenylene oxides with halogenated phosphorus compounds.

Among processes of modifying polyphenylene oxides by use of halogenated phosphorus compounds, there has been known a process for preparing a polyphenylene oxide having a chloroalkyl substituent by reacting a polyphenylene oxide with a chlorine gas, in which the reaction is effected in the presence of phosphorus trichloride to obtain a polyphenylene oxide having a chloroalkyl substituent containing 80% or more of chlorine in the alkyl group bonded to the aromatic nucleus and 20% or less of chlorine in the aromatic nucleus, (see U.S. Pat. 3,334.069). Although the present stabilization uses phosphous trichloride, it is concerned not with the chlorination of polyphenylene oxides but with the stabilization of polyphenylene oxides by reaction with halogenated phosphorus compounds, as will be explained in detail below.

With no evidence, the inventors believe that through the procedure of this invention the stabilized polyphenylene oxide can be obtained by removal of hydrogen halide and, besides, by removing off harmful impurities contained in the polymer through the reaction with halogenated phosphorus compounds.

It is therefore an object of the present invention to provide a process for the stabilization of polyphenylene oxides.

Other objects will become apparent from the following description.

Polyphenylene oxides which are subjected to stabilization of the present process are represented by the general formula:

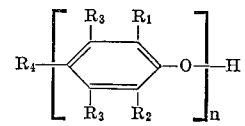

wherein $n$ is a positive integer and is at least 50; $R_1$, $R_2$, $R_3$ and $R_5$ are selected from the group consisting of hydrogen atom, halogen atoms, hydrocarbon groups, halohydrocarbon groups, alkoxy groups, phenoxy groups; and $R_4$ is selected from the group consisting of hydrogen and halogen atoms. Examples of $R_1$, $R_2$, $R_3$ and $R_5$ are hydrogen, chlorine, bromine and iodine atoms, and methyl, ethyl, propyl, allyl, phenyl, benzyl, methylbenzyl, chloromethyl, bromomethyl, cyanoethyl, cyano, methoxy, ethoxy, phenoxy groups. Examples of $R_4$ are hydrogen chlorine, bromine and iodine atoms.

Concretely, the polyphenylene oxides include, for example, poly-2,6-dimethyl-1,4-phenylene oxide,
poly-2,6-diethyl-1,4-phenylene oxide,
poly-2,6-dipropyl-1,4-phenylene oxide,
poly-2-methyl-6-isopropyl-1,4-phenylene oxide,
poly-2,6-dimethoxy-1,4-phenylene oxide,
poly-2,6-dichloromethyl-1,4-phenylene oxide,
poly-2,6-dibromomethyl-1,4-phenylene oxide,
poly-2,6-diphenyl-1,4-phenylene oxide,
poly-2,6-ditolyl-1,4-phenylene oxide,
poly-2,6-dichloro-1,4-phenylene oxide and
poly-2,5-dimethyl-1,4-phenylene oxide.

Halogenated phosphorus compounds which are allowed to react with the polyphenylene oxide in the present invention, are trihalogenated phosphorus compounds, dihalogenated phosphorus compounds and monohalogenated phosphorus compounds or mixtures thereof, and are represented by the general formula:

$$(RO)_m PX_{3-m}$$

wherein $m$ is 0, 1 or 2; X is a halogen atom, such as, chlorine, bromine, iodine or the like, chlorine being preferred from an industrial standpoint; R is a hydrocarbon group having not more than 15 carbon atoms or a chlorinated hydrocarbon group having not more than 15 carbon atoms, and in case $m$ is 2, the R's may be the same or different and may form a ring when taken together.

Among trihalogenated phosphorus compounds, dihalogenated phosphorus compounds and monohalogenated phosphorus compounds, trihalogenated phosphorus compounds are most effective and are preferred from an industrial standpoint. However, dihalogenated phosphorus compounds and monohalogenated phosphorus compounds have also a stabilization effect.

Concretely, the halogenated phosphorus compounds include, for example trihalogenated phosphorus compounds, such as, phosphorus trichloride, phosphorus tribromide, phosphorus triiodide and phosphorus trifluoride; carbonoxy-dichlorophosphines, such as, methoxydichlorophosphine, ethoxydichlorophosphine, n-propoxydichlorophosphine, isopropoxydichlorophosphine, n-butoxydichlorophosphine, isobutoxydichlorophosphine, sec-butoxydichlorophosphine, neopentoxydichlorophosphine, 1-methylheptoxydichlorophosphine, phenoxydichlorophosphine, p-(1,1,3,3-tetramethylbutyl)phenoxydichlorophosphine and nonylphenoxydichlorophosphine; carbonoxydibromophosphines, such as phenoxydibromophosphine; carbonoxydifluorophosphines, such as, methoxydifluorophosphine; halogenocarbonoxydichlorophosphines, such as 2,2,2-trichloro - 1,1 - dimethylethoxydichlorophosphine, 2,2,2-trichloroethoxydichlorophosphine, 2-chloro-ethoxydichlorophosphine and chlorophenoxydichlorophosphine; dicarbonoxychlorophosphines, such as, dimethoxychlorophosphine, diethoxychlorophosphine, dipropoxychlorophosphine, dibutoxychlorophosphine, dicyclohexoxychlorophosphine, diphenoxychlorophosphine, phenoxy-p-methylphenoxychlorophosphine and bis-nonylphenoxychlorophosphine; dicarbonoxybromophosphines, such as, diphenoxybromophosphine; dicarbonoxylfluorophosphines, such as, diethoxyfluorophosphine; bis-halogenocarbonoxychlorophosphines, such as, bis(2-chloroethoxy)chlorophosphine, bis-(2,2,2-trichloroethoxy)chlorophosphine and bis (o-chlorophenoxy)chlorophosphine; and cyclic esters of phosphorochloridous acid, such as phosphorochloridous acid ethylene ester, phosphorochloridous acid 1,1-dimethylethylene ester and phosphorochloridous acid trimethylene ester.

The amounts of the halogenated phosphorus compounds to be used in the present process are not particularly limited. However, the halogenated phosphorus compounds should be used in amounts at least equimolar to the hydroxyl groups of the polyphenylene oxides. Even if the halogenated phosphorus compounds are used in excess, no detrimental effect is observed.

The reaction of the polyphenylene oxide with the halogenated phosphorus compound progresses even in the absence of reaction promotor. In this case, however, there are brought about such industrially undesirable phenomena as decrease in yield and lowering in molecular weight which are considered ascribable to the depolymerization of polymer caused by hydrogen halide formed in the reaction. In order to avoid such undesirable phenomena, it is effective to use, as reaction promotors, organic or inorganic basic compounds, and particularly amine compounds. These organic and inorganic basic compounds include, for example, piperidine, triethylamine, diethylamine, ethylamine, trimethylamine, dimethylamine, methylamine, cyclohexylamine, benzylamine, ethylenediamine, ethanolamine, hydroxyamine, hydrazine, ammonia, aniline, diphenylamine, triphenylamine, N-methylaniline, N,N - dimethylaniline, m-phenylenediamine, ethylenediamine, morpholine, hexamethylenetetramine, pyridine, 4-aminopyridine, quinoline, acridine, trimethylphosphine, triethylphosphine, n-butylphenyl ether, sodium methylate, sodium ethylate, sodium acetate, sodium formate, sodium hydroxide, potassium hydroxide,, calcium hydroxide, barium carbonate, sodium carbonate, potassium carbonate and sodium hydrogen-carbonate.

The reaction promotors are not particularly limited in amounts employed but are preferably used at concentrations less than about 20% by weight based on the whole reaction mixture. If desired, however, they may be used in excess of said range.

The reaction of free hydroxyl groups of the polyphenylene oxide with the halogenated phosphorus compound may be carried out in the absence of reaction solvent. Generally, however, the reaction is desirably effected in the presence of a reaction solvent, whereby the control of reaction conditions and the treatment of product can be facilitated. For example, the reaction is carried out by adding the halogenated phosphorus compound directly to a solution of the polymer in a solvent or to a polymerization reaction mixture containing the polymer. The procedure is adopted depending upon the polymerization conditions or stabilization reaction conditions. The reaction solvent employed may be any of the known solvents so far as it is inert to the polyphenylene oxide and the halogenated phosphorus compound and is liquid at the reaction temperature. Examples of such reaction solvents are chain or cyclic aliphatic or aromatic hydrocarbons, derivatives of said hydrocarbons, e.g. nitro compounds and halides, ethers, ketones, lactones and sulfonates. Of these, heptane, benzene, toluene, xylene, monochlorobenzene, dichlorobenzene, nitrobenzene, methylcyclohexane, dichloromethane, dichloroethane, diethyl ether, tetrahydrofuran, dioxane, acetone, ethyl acetate, propiolactone and acetonitrile are commonly used. These solvents are used in 1–200 times, preferably 2–100 times amount (weight) of the polyphenylene oxide. Even when the above solvents contain small amounts of solvents active to the halogenated phosphorus compounds, they are not harmful to the present process so far as there remains unreacted halogenated phosphorus compound in the reaction mixture, though the halogenated phosphorus compounds are consumed to a certain extent by reaction therewith. Such active solvents are, for example, compounds having hydroxyl groups such as water, methyl alcohol, ethyl alcohol, butyl alcohol and β-methoxyethanol.

In the case where no solvent is used, there is adopted an ordinary process, e.g. a process in which the polyphenylene oxide in the form of a powder is contacted with the halogenated phosphorus compound. The halogenated phosphorus compound is used in any form of a gas or a liquid.

The reaction can be effected at atmospheric pressure, but may also be carried out under pressure or under reduced pressure in order to bring the halogenated phosphorus compound and/or the solvent into a desired phase.

The reaction temperature may be freely selected within a range where no decomposition of the polyphenylene oxide is brought about. Ordinarily, however, a temperature up to 150° C. is preferable.

The reaction time varies depending on the kind of halogenated phosphorus compound, on whether a reaction promotor is used or not, or on the reaction temperature employed. Ordinarily, however, the reaction time is within the range of 10 minutes to 5 hours.

In case the reaction of polyphenylene oxide with halogenated phosphorous compound has been effected in the presence of a reaction solvent, after completion of the reaction, the reaction liquid is charged into or is incorporated with a suitable amount of a poor solvent for the polyphenylene oxide, whereby a polymer is deposited. This polymer is separated by filtration, and is washed and dried to obtain a desired polymer. Examples of the poor solvents used in the present invention include aliphatic hydrocarbons such as heptane, hexane, petroleum ether, and ligroin; alcohols such as methanol, ethanol, propanol, butanol and cyclohexanol; ketones such as acetone and methylethylketone; ethers such as diethyl ether and benzyl ether; acids such as sulfuric acid and acetic acid; and acid anhydride such as acetic anhydride.

Depending on the kind of halogenated phosphorous compound employed in the stabilization reaction or on the reaction conditions, the operation for removing slight amounts of residual halogen atoms bonded to phosphorus atoms may be effected, in the step of depositing a polymer from the reaction mixture, by using poor solvents active to the halogen atoms bonded to phosphorus atoms, e.g. alcohols such as methanol, ethanol, propanol, butanol and cyclohexanol, or by using inert poor solvents containing small amounts of compounds active to said halogen atoms. Alternatively, a stabilized polymer may sometimes be taken out, after completion of the reaction, according to a process carried out by vaporizing the reaction liquid to dryness or to a process using a spray drier.

When a polyphenylene oxide stabilized according to the present process and an unstabilized polyphenylene oxide are individually pressed at 270° C., and 100 kg./cm.² for 10 minutes to form sheets and the two sheets are compared in coloration, the sheet formed from the unstabilized polymer undergoes thermal oxidation and is colored to brown, whereas the sheet formed from the stabilized polymer is scarcely colored. Further, when a polyphenylene oxide stabilized according to the present process and an unstabilized polyphenylene oxide are individually formed from chloroform solution into films of about 0.05 mm. in thickness and the two films are compared in amount of gel formed after heating at 222° C., for 45 minutes in an oxygen atmosphere, the film formed from the unstabilized polymer has been substantially gelled whereas the film formed from the stabilized polymer is less in amount of gel formed. Generally, a film, which is large in amount of gel formed is not favourable in results of flow test.

The present process brings about such a significant advantage that polyphenylene oxides stable to thermal oxidation can be obtained in high yields.

The present invention will be illustrated below with reference to examples, but the examples are merely illustrative and are not limitative, and various modifications thereof are possible within the scope of the present invention.

EXAMPLE 1

10.0 g. of poly-2,6-dimethyl-1,4-phenylene oxide having an intrinsic viscosity of 0.73 dl./g. as measured in chloroform at 25° C., was dissolved in 100 ml. of xylene. To this solution, 0.6 g. of aniline and 0.3 g. of phosphorus trichloride were added, and the mixture was reached with stirring at 70° C. for 1 hour. The resulting reaction mixture was charged into about 400 ml. of methanol, and a precipitate formed was recovered by filtration, washed with methanol, and then with water, and dried at 90° C. for 10 hours to obtained 9.87 g. of a stablished polymer having an intrisic viscosity of 0.74 dl./g., yield 98.7%.

The stabilized polyphenylene oxide and the unstabilized polyphenylene oxide were individually pressed at 270° C., and 100 kg./cm.² for 10 minutes to form sheets. The two sheets were compared in coloration to find that the sheet formed from the unstabilized polymer had been colored to brown, whereas the sheet formed from the stabilized polymer had been scarcely colored.

Further, the stabilized polymer and the unstabilized polymer were individually formed from chloroform solutions thereof into films of about 0.05 mm. in thickness. The thus formed films were heated at 222° C. for 45 minutes in an oxygen atmosphere. Thereafter, each film was extracted with chloroform by use of a Soxhlet extractor, and the ratio of the weight of film after extraction to the weight of film before extraction was calculated to decide the gel formation ratio of the polymer used. As the result, the gel formation ratio of the unstabilized polymer was 92.1%, whereas that of the stabilized polymer was 61.3%.

Further, in the infrared absorption spectrum of the film formed from the stabilized polymer there was observed no such absorption at 3550 cm.$^{-1}$ derived from phenolic hydroxyl groups as observed in the infrared absorption spectrum of the film formed from the unstabilized polymer.

When determined according to Verley method, the amount of hydroxyl group of the unstabilized polymer was 0.089% by weight, whereas that of the stabilized polymer was 0.002% by weight.

The stabilized polymer was subjected to elementary analysis to find that it contained 0.27% by weight of phosphorus and 0.02% by weight of chlorine, while the unstabilized polymer showed a chlorine content of 0.02% by weight when subjected to blank test on elementary analysis of chlorine.

EXAMPLE 2

3.0 g. of poly-2,6-dimethyl - 1,4 - phenylene oxide having an intrinsic viscosity of 0.72 dl./g. as measured in chloroform at 25° C., was dissolved in 100 ml. of xylene. To this solution, 10.0 g. of triethylamine and 2.7 g. of phosphorus trichloride were added, and the mixture was reacted with stirring at 60° C. for 5 hours. The resulting reaction mixture was charged into about 500 ml. of methanol, and a precipitate formed was washed with methanol and then with water, and dried at 90° C. for 10 hours to obtain 2.93 g. of a stabilized polymer having an intrinsic viscosity of 0.74 dl./g., yield 97.7%.

In the same manner as in Example 1, thermal oxidation test by pressing was effected to find that a sheet formed from the unstabilized polymer was colored to brown, whereas a sheet formed from the stabilized polymer was scarcely colored. The gel formation ratio of the stabilized polymer was 60.2%.

Further, the stabilized polymer was subjected to elementary analysis to find that it contained 0.26% by weight of phosphorus and 0.02% by weight of chlorine, while the unstabilized polymer showed a chlorine content of 0.03% by weight when subjected to blank test on elementary analysis of chlorine.

EXAMPLE 3

3.0 g. of poly-2,6-dimethyl-1,4-phenylene oxide having an intrinsic viscosity of 0.63 dl./g. was dissolved in 100 ml. of xylene. To this solution, 0.03 g. of p-benzoquinone, 10.0 g. of triethylamine and 3.0 g. of dimethoxychlorophosphine were added, and the mixture was reacted with stirring at 60° C., for 5 hours. The resulting reaction mixture was charged into about 500 ml. of methanol, and a precipitate formed was recovered by filtration, washed with water, and dried at 90° C., for 10 hours to obtain 2.82 g. of stabilized polymer, yield 94.0%.

In the same manner as in Example 1, thermal oxidation test by pressing was effected to find that a sheet formed from the unstabilized polymer was colored to brown, whereas a sheet formed from the stabilized polymer was scarcely colored.

The gel formation ratio of the stabilized polymer was 63.1%.

EXAMPLE 4

Example 3 was repeated, except that 3.0 g. of a mixture comprising methoxydichlorophosphine and dimethoxychlorophosphine was used in place of 3.0 g. of dimethoxychlorophosphine, to obtain 28.9 g. of a stabilized polyphenylene oxide, yield 96.3%.

In the same manner as in Example 1, thermal oxidation test by pressing was effected to find that a sheet formed from the unstabilized polymer was colored to brown whereas a sheet formed from the stabilized polymer was scarcely colored.

The gel formation ratio of the stabilized polymer was 65.2%.

EXAMPLE 5

Example 3 was repeated, except that 3.0 g. of a mixture comprising phenoxydichlorophosphine and diphenoxychlorophosphine was used in place of 3.0 g. of dimethoxychlorophosphine, to obtain 2.81 g. of a stabilized polyphenylene oxide, yield 93.7%.

In the same manner as in Example 1, thermal oxidation test by pressing was effected to find that a sheet formed from the unstabilized polymer was colored to brown, whereas a sheet formed from the stabilized polymer was scarcely colored.

The gel formation ratio of the stabilized polymer was 67.3%.

EXAMPLE 6

Example 3 was repeated, except that mixture comprising 1.4 g. of phosphorus trichloride and 0.6 g. of methanol was used in place of 3.0 g. of dimethoxychlorophosphine and that 0.03 g. of p-benzoquinone was not added, to obtain 2.91 g. of a stabilized polyphenylene oxide, yield 97.0%.

In the same manner as in Example 1, thermal oxidation test by pressing was effected to find that a sheet formed from the unstabilized polymer was colored to brown, whereas a sheet formed from the stabilized polymer was scarcely colored.

EXAMPLE 7

35.0 g. of poly-2,6-dimethyl-1,4-phenylene oxide having an intrinsic viscosity of 0.97 dl./g. was dissolved in 350 ml. of xylene. To this solution, 0.75 g. of aniline and 1.05 g. of phosphorus trichloride were added, and the mixture was reacted with stirring at 70° C., for 1 hour. The resulting reaction mixture was charged into methanol, and a precipitate formed was recovered by filtration, washed with methanol, and then with water, and dried at 90° C., for 10 hours to obtain 34.2 g. of a stabilized polymer having an intrinsic viscosity of 1.07 dl./g., yield 97.7%.

In the same manner as in Example 1, thermal oxidation test by pressing was effected to find that a sheet formed from the unstabilized polymer was colored to brown, whereas a sheet formed from the stabilized polymer was scarcely colored.

The gel formation ratio of the stabilized polymer was 59.8%.

Further, the stabilized polymer was subjected to elementary analysis to find that it contained 0.26% by weight of phosphorus and 0.19% by weight of chlorine.

EXAMPLES 8–16

3.0 g. of poly-2,6-dimethyl-1,4-phenylene oxide was dissolved in 100 ml. of xylene. To this solution, the basic compounds shown in Table 1 and phosphorus trichloride were added, and the mixtures were reacted with stirring at such temperature and periods of time as set forth in Table 1. The resulting reaction mixtures were treated in the same manner as in Example 1 to obtain stabilized polymers. In the same manner as in Example 1, thermal oxidation test by pressing was effected to find that a sheet formed from the unstabilized polymer was colored to brown, whereas sheets formed from the stabilized polymers, including those obtained without the addition of basic compounds were scarcely colored. However, in the case where the reaction was effected in the absence of the basic compounds, there were brought about the decrease in yield and the lowering in molecular weight, whereas in the case where the reaction was effected in the presence of the basic compounds, said drawbacks could be avoided. The reaction conditions employed and the results obtained are shown in Table 1.

about 500 ml. of methanol, and a precipitate formed was recovered by filtration, washed with methanol, and then with water, and dried at 90° C. for 10 hours to obtain 9.52 g. of a stabilized polymer, yield 95.2%.

In the same manner as in Example 1, thermal oxidation test by pressing was effected to find that a sheet formed from the unstabilized polymer was colored to brown, whereas a sheet formed from the stabilized polymer was scarcely colored.

The gel formation ratio of the stabilized polymer was 70.1%.

EXAMPLE 18

6.0 g. of poly-2,6-dimethyl-1,4-phenylene oxide having an intrinsic viscosity of 0.72 dl./g. was dissolved in 200 ml. of xylene. To this solution, 4.33 g. of phosphorus trichloride was added, and the mixture was reacted with stirring at 30° C. for 2 hours. The resulting reaction mixture was charged into 500 ml. of acetone, and a precipitate formed was recovered by filtration, washed with acetone, and dried at 90° C. for 10 hours to obtain 5.5 g. of a stabilized polymer having an intrinsic viscosity of 0.72 dl./g., yield 91.7%.

In the same manner as in Example 1, thermal oxidation test by pressing was effected to find that a sheet formed from the unstabilized polymer was colored to brown, whereas a sheet formed from the stabilized polymer was scarcely colored.

The gel formation ratio of the stabilized polymer was 61.9%.

Further, the stabilized polymer was subjected to elementary analysis to find that it contained 0.12% by weight of phosphorus and 0.14% by weight of chlorine.

EXAMPLE 19

6.0 g. of the same poly-2,6-dimethyl-1,4-phenylene oxide as in Example 18 was dissolved in 200 ml. of xylene. To this solution, 4.33 g. of phosphorus trichloride was added, and the mixture was reacted at 30° C. for 2 hours. The resulting reaction mixture was charged with 10.0 g. of triethylamine and 3.0 g. of phenol and was then reacted at 50° C. for 1 hour. Thereafter, the same treatments as in Example 1 were effected to obtain 5.4 g. of a stabilized polymer having an intrinsic viscosity of 0.70 dl./g., yield 90.0%.

In the same manner as in Example 1, thermal oxidation test by pressing was effected to find that a sheet formed from the unstabilized polymer was colored to brown,

TABLE 1

| Example | Basic compound | Phosphorus trichloride (g.) | Reaction temp. (° C.) | Reaction time (hrs.) | Intrinsic viscosity (dl./g.) Before reaction | Intrinsic viscosity (dl./g.) After reaction | Yield (weight percent) | Elementary analysis (weight percent) P | Elementary analysis (weight percent) Cl |
|---|---|---|---|---|---|---|---|---|---|
| 8 | Triethylamine | 1.1 | 0.3 | 70 | 1 | 0.97 | 0.98 | 98.3 | 0.27 | 0.02 |
| 9 | do | 10.0 | 2.0 | 30 | 2 | 0.75 | 0.77 | 96.7 | 0.13 | 0.04 |
| 10 | N,N-dimethylaniline | 0.8 | 0.3 | 70 | 1 | 0.97 | 0.95 | 99.7 | 0.20 | 0.05 |
| 11 | Aniline | 0.4 | 0.3 | 70 | 1 | 0.97 | 0.99 | 99.7 | 0.19 | 0.07 |
| 12 | Ethylenediamine | 0.1 | 0.3 | 70 | 1 | 0.97 | 0.92 | 97.6 | 0.21 | 0.21 |
| 13 | Piperidine | 5.0 | 1.0 | 50 | 2 | 0.77 | 0.80 | 96.6 | 0.24 | 0.01 |
| 14 | Pyridine | 0.6 | 0.3 | 70 | 1 | 0.97 | 0.97 | 98.1 | 0.22 | 0.04 |
| 15 | None | | 0.2 | 70 | 1 | 0.72 | 0.52 | 89.0 | 0.15 | 0.43 |
| 16 | do | | 0.3 | 70 | 1 | 0.97 | 0.79 | 91.1 | 0.20 | 0.41 |

The polymers prior to the stabilization reaction showed chlorine contents of 0.02 to 0.03% by weight when subjected to blank test an elementary analysis of chlorine.

EXAMPLE 17

10.0 g. of the same poly-2,6-dimethyl-1,4-phenylene oxide as in Example 3 was dissolved in 100 ml. of xylene. To this soltuion, 0.01 g. of p-benzoquinone, 0.085 g. of sodium methylate and 0.85 g. of phosphorus trichloride were added, and the mixture was reacted at 30° C. for 2 hours. The resulting reaction mixture was charged into whereas a sheet formed from the stabilized polymer was scarcely colored.

EXAMPLE 20

0.4 g. of triethylamine and 6.7 g. of phosphorus trichloride were added to a reaction mixture containing 8.6 g. of poly - 2,6 - dimethyl - 1,4 - phenylene oxide having an intrinsic viscosity of 0.67 dl./g. which had been obtained by the oxidation polymerization of 2,6-xylenol in xylene containing a small amount of methyl alcohol in the presence of a manganese chloride-sodium methylate catalyst, and the mixture was reacted at 30° C. for 2 hours. The resulting reaction mixture was charged into methanol containing a slight amount of hydrochloric acid, and a precipitate formed was recovered by filtration, washed with methanol and then with water, and dried at 90° C. to obtain 8.1 g. of a stabilized polymer having an intrinsic viscosity of 0.63 dl./g.

In the same manner as in Example 1, the stabilized polymer was subjected to thermal oxidation test by pressing to find that said polymer had been greatly improved in coloration as compared with the unstabilized polymer. The gel formation ratio of the stabilized polymer was 64.1%.

EXAMPLE 21

A reaction mixture containing 19.0 g. of poly - 2,6 - dimethyl-1,4-phenylene oxide having an intrinic viscosity of 0.78 dl./g., which had been obtained by the oxidation polymerization of 2,6-xylenol using the same polymerization system as in Example 20, was subjected to distillation at 40° C. and 200 mm. Hg to remove methanol and water therefrom. To this mixture, 8.3 g. of triethylamine and 11.3 g. of phosphorus trichloride were added, and the mixture was reacted at 30° C. for 2 hours. The resulting reaction mixture was charged into methanol containing a slight amount of hydrochloric acid, and a precipitate formed was recovered by filtration, washed with methanol, and then with water, and dried at 90° C. to obtain 18.3 g. of a stabilized polymer having an intrinsic viscosity of 0.76 dl./g. In the same manner as in Example 1, the stabilized polymer was subjected to thermal oxidation test by pressing to find that said polymer had been greatly improved in coloration as compared with the unstabilized polymer.

EXAMPLE 22

Example 21 was repeated, except that the triethylamine was not used, to obtain 16.9 g. of a stabilized polymer having an intrinsic viscosity of 0.74 dl./g. In the same manner as in Example 1, the stabilized polymer was subjected to thermal oxidation test by pressing to find that said polymer had been greatly improved in coloration as compared with the unstabilized polymer.

EXAMPLE 23

A reaction liquid, which had been obtained by the oxidation polymerization of 2,6-xylenol using the same polymerization system as in Example 20, was subjected to washing with water and then to distillation at 60° C. and 60–80 mm. Hg to remove methanol and water therefrom, whereby a liquid containing 12.3 g. of poly-2,6-dimethyl 1,4-phenylene oxide, 0.5 g. of water and 87.2 g. of xylene was formed. To this liquid, 0.3 g. of phosphorus trichloride was added, and the mixture was reacted at 60° C. for 1 hour. The resulting reaction mixture was charged into 400 ml. of methanol, and a precipitate formed was recovered by filtration, washed with methanol, and then with water, and dried at 90° C. for 10 hours to obtain 11.2 g. of a stabilized polymer having an intrinsic viscosity of 0.69 dl./g.

In the same manner as in Example 1, the stabilized polymer was subjected to thermal oxidation test by pressing to find that said polymer had been greatly improved in coloration as compared with the unstabilized polymer.

EXAMPLE 24

Example 23 was repeated, except that 0.4 g. of aniline was added in addition to 0.3 g. of phosphorus trichloride, to obtain 12.0 g. of a stabilized polymer having an intrinsic viscosity of 0.75 dl./g.

In the same manner as in Example 1, the stabilized polymer was subjected to thermal oxidation test by pressing to find that said polymer had been greatly improved in coloration as compared with the unstabilized polymer.

EXAMPLES 25–27

3.0 g. of polyphenylene oxide shown in Table 2 was dissolved in 100 ml. xylene. To this solution, 0.28 g. of aniline and 0.14 g. of phosphorus trichloride were added, and the mixtures were reacted with stirring at 60° C. for 1 hour. The resulting reaction mixture was treated in the same manner as in Example 1 to stabilized polymers. In the same manner as in Example 1, thermal oxidation test by pressing was effected to find that sheets formed from the unstabilized polyymers were colored to brown, whereas sheets formed from the stabilized polymers were scarcely colored. The results obtained are shown in Table 2.

TABLE 2

| Ex. | Polyphenylene oxide | Intrinsic viscosity (dl./g.) Before reaction | After reaction | Yield (wt. percent) |
|---|---|---|---|---|
| 25 | Poly-2,6-dichloro-1,4-phenylene oxide. | 0.51 | 0.53 | 98.3 |
| 26 | Poly-2,6-diallyl-1,4-phenylene oxide. | 0.55 | 0.60 | 99.1 |
| 27 | Poly-2,6-dimethoxy-1,4-phenylene oxide. | 0.62 | 0.61 | 98.5 |

EXAMPLES 28–32

5.0 g. of poly - 2,6 - dimethyl - 1,4 - phenylene oxide was dissolved in 100 ml. of xylene. To this solution, a basic compound and a halogenated phosphorus compound were added, and the resulting mixture was reacted with stirring at the desired temperature and for the desired period of time shown in Table 3.

The resulting reaction mixture was treated in the same manner as in Example 1 to obtain a stabilized polymer. In the same manner as in Example 1, the stabilized polymer was subjected to thermal oxidation test by pressing to find that said polymer had been greatly improved in coloration as compared with the unstabilized polymer. The results obtained are as shown in Table 3.

TABLE 3

| Example No. | Basic compound | G. | Halogenated phosphorus compound | G. | Reaction temp. (° C.) | Reaction time (hrs.) | Intrinsic viscosity (dl./g.) Before reaction | After reaction | Yield (wt. percent) |
|---|---|---|---|---|---|---|---|---|---|
| 28 | Aniline | 0.4 | Methoxydichlorophosphine | 0.3 | 70 | 1 | 0.65 | 0.66 | 98.2 |
| 29 | do | 0.3 | Butoxydichlorophosphine | 0.3 | 70 | 1 | 0.65 | 0.65 | 99.2 |
| 30 | Piperidine | 0.4 | Phenoxydichlorophosphine | 0.4 | 70 | 2 | 0.59 | 0.58 | 97.9 |
| 31 | n-Butylamine | 0.4 | Diphenoxychlorophosphine | 0.5 | 70 | 3 | 0.71 | 0.70 | 98.5 |
| 32 | do | 0.4 | Isopropoxydichlorophosphine | 0.3 | 70 | 3 | 0.71 | 0.69 | 98.0 |
| 33 | Aniline | 0.4 | Ethoxydichlorophosphine | 0.3 | 70 | 1 | 0.65 | 0.67 | 98.8 |

What is claimed is:
1. A process for the stabilization of a polyphenylene oxide, which comprises reacting a polyphenylene oxide having a structure represented by the general formula:

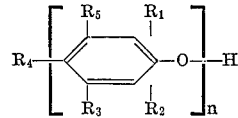

wherein $n$ is a positive integer of at least 50; $R_1$, $R_2$, $R_3$ and $R_5$ are individually a hydrogen atom, a halogen atom, a hydrocarbon group, a halohydrocarbon group, an alkoxy group or a phenoxy group; and $R_4$ is a hydrogen or halogen atom, with a halogenated phosphorus compound represented by the general formula:

$$(RO)_mPX_{3-m}$$

wherein R is a hydrocarbon group having 1–15 carbon atoms or a chlorohydrocarbon group having 1–15 carbon atoms; X is a halogen atom, and $m$ is 0, 1 or 2.

2. A process according to claim 1, wherein the $R_1$ or $R_2$ group is alkyl.

3. A process according to claim 1, wherein the $R_1$ and $R_2$ groups are alkyl.

4. A process according to claim 1, wherein the polyphenylene oxide is a poly-2,6-dimethyl-1,4-phenylene oxide.

5. A process according to claim 1, wherein the $R_1$ or $R_2$ group is methoxy.

6. A process according to claim 1, wherein the $R_1$ and $R_2$ groups are methoxy.

7. A process according to claim 1, wherein the $R_1$ or $R_2$ group is allyl.

8. A process according to claim 1, wherein the $R_1$ and $R_2$ groups are allyl.

9. A process according to claim 1, wherein the $R_1$ or $R_2$ group is a chlorine atom.

10. A process according to claim 1, wherein the $R_1$ and $R_2$ groups are chlorine atoms.

11. A process according to claim 1, wherein the halogen atom of the halogenated phosphorus compound is chlorine.

12. A process according to claim 1, wherein the halogenated phosphorus compound is phosphorus trichloride.

13. A process according to claim 1, wherein R is a hydrocarbon group having 1–15 carbon atoms and $m$ is 1.

14. A process according to claim 1, wherein R is a hydrocarbon group having 1–15 carbon atoms and $m$ is 2.

15. A process according to claim 1, wherein the halogenated phosphorus compound is one member selected from the group consisting of methoxy dichlorophosphine, ethoxydichlorophosphine, propoxydichlorophosphine, butoxydichlorophosphine and phenoxydichlorophosphine.

16. A process according to claim 1, wherein the halogenated phosphorus compound is one member selected from the group consisting of dimethoxydichlorophosphine and diphenoxydichlorophosphine.

17. A process for the stabilization of a polyphenylene oxide, which comprises reacting a polyphenylene oxide having a structure represented by the general formula:

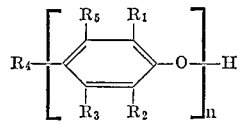

wherein $n$ is a positive integer of at least 50; $R_1$, $R_2$, $R_3$ and $R_4$ are individually a hydrogen atom, a halogen atom, a hydrocarbon group, a halohydrocarbon group, an alkoxy group or a phenoxy group, and $R_4$ is a hydrogen or halogen atom, in the presence of a basic compound, with a halogenated phosphorus compound represented by the general formula:

$$(RO)_mPX_{3-m}$$

wherein R is a hydrocarbon group having 1–15 carbon atoms or a chlorohydrocarbon group having 1–15 carbon atoms; X is a halogen atom; and $m$ is 0, 1 or 2.

18. A process according to claim 17, wherein the basic compound is an amine compound.

19. A process according to claim 17, wherein the basic compound is aniline.

20. A process according to claim 17, wherein the basic compound is one member selected from the group consisting of triethylamine, N,N-dimethylaniline, piperidine, pyridine, ethylenediamine and n-butylamine.

References Cited

UNITED STATES PATENTS

| | | | |
|---|---|---|---|
| 3,226,361 | 12/1965 | Borman | 260—47 |
| 3,306,875 | 2/1967 | Hay | 260—47 |
| 3,375,228 | 3/1968 | Holoch et al. | 260—47 |
| 3,392,146 | 7/1968 | Anderson et al. | 260—47 |
| 3,402,143 | 9/1968 | Hay | 260—47 |
| 3,420,792 | 1/1969 | Zuccaro | 260—45.9 |
| 3,424,722 | 1/1969 | Jerussi et al. | 260—47 |
| 3,429,850 | 2/1969 | Holoch | 260—45.9 |

FOREIGN PATENTS

| | | |
|---|---|---|
| 4,277 | 2/1967 | Japan. |
| 22,070 | 10/1967 | Japan. |

MELVIN GOLDSTEIN, Primary Examiner

U.S. Cl. X.R.

260—47 P